US012638699B2

(12) United States Patent
Ookubo et al.

(10) Patent No.: US 12,638,699 B2
(45) Date of Patent: May 26, 2026

(54) METHOD FOR MANUFACTURING SPECTACLE LENS, AND SPECTACLE LENS

(71) Applicant: HOYA LENS THAILAND LTD., Pathumthani (TH)

(72) Inventors: Shigeki Ookubo, Tokyo (JP); Takako Ishizaki, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 300 days.

(21) Appl. No.: 18/284,642

(22) PCT Filed: Feb. 16, 2022

(86) PCT No.: PCT/JP2022/006181
§ 371 (c)(1),
(2) Date: Sep. 28, 2023

(87) PCT Pub. No.: WO2022/209382
PCT Pub. Date: Oct. 6, 2022

(65) Prior Publication Data
US 2024/0184141 A1 Jun. 6, 2024

(30) Foreign Application Priority Data
Mar. 31, 2021 (JP) ................................ 2021-059939

(51) Int. Cl.
| | |
|---|---|
| *G02C 7/06* | (2006.01) |
| *G02B 1/14* | (2015.01) |
| *G02B 3/08* | (2006.01) |

(52) U.S. Cl.
CPC ................. *G02C 7/06* (2013.01); *G02B 1/14* (2015.01); *G02B 3/08* (2013.01)

(58) Field of Classification Search
CPC ...... G02C 7/06; G02C 7/022; G02C 2202/24; G02B 1/14; G02B 3/08; B29C 2791/009;
(Continued)

(56) References Cited

U.S. PATENT DOCUMENTS

| | | |
|---|---|---|
| 2010/0141729 A1 | 6/2010 | Petsch et al. |
| 2017/0131567 A1 | 5/2017 | To et al. |
| | (Continued) | |

FOREIGN PATENT DOCUMENTS

| | | |
|---|---|---|
| CN | 111796436 A | 10/2020 |
| CN | 112534340 A | 3/2021 |
| | (Continued) | |

OTHER PUBLICATIONS

PCT/JP2022/006181, "English Translation of International Search Report", May 10, 2022, 2 pages.
(Continued)

*Primary Examiner* — William R Alexander
(74) *Attorney, Agent, or Firm* — Oliff PLC

(57) ABSTRACT

There is provided a method for manufacturing a spectacle lens, including: preparing a lens substrate having a resin-containing hard coat film formed on at least one main surface; and forming a plurality of protuberances in which at least one of the lens substrate or the hard coat film is protruded, by irradiating the hard coat film with a laser.

9 Claims, 5 Drawing Sheets

<u>100</u>

(58) Field of Classification Search
CPC .................. B29C 59/022; B29C 59/16; B29D
11/00009; B29D 11/00326; B29D
11/00865; B29D 11/00028; B29D
11/00355
USPC ...................................................... 351/159.41
See application file for complete search history.

(56) References Cited

U.S. PATENT DOCUMENTS

| | | | |
|---|---|---|---|
| 2018/0110655 A1* | 4/2018 | Bendett | A61F 9/00827 |
| 2019/0235279 A1 | 8/2019 | Hones et al. | |
| 2020/0073147 A1* | 3/2020 | Bakaraju | G02C 7/022 |
| 2020/0089023 A1* | 3/2020 | Zhou | G02C 11/10 |
| 2020/0361165 A1 | 11/2020 | Wu et al. | |
| 2021/0370553 A1 | 12/2021 | Toyoshima | |
| 2022/0035179 A1 | 2/2022 | Rappon et al. | |
| 2022/0146857 A1* | 5/2022 | Hones, Jr. | B29D 11/00326 |

| | | | |
|---|---|---|---|
| 2023/0256692 A1* | 8/2023 | Kastner | G02C 7/022 |
| | | | 427/165 |
| 2023/0341706 A1* | 10/2023 | Christmann | B29D 11/00009 |
| 2024/0417588 A1* | 12/2024 | Liang | G02B 1/11 |

FOREIGN PATENT DOCUMENTS

| | | |
|---|---|---|
| WO | 2019124353 A1 | 6/2019 |
| WO | 2020014613 A1 | 1/2020 |
| WO | 2020/180817 A1 | 9/2020 |

OTHER PUBLICATIONS

Jan. 17, 2025 Extended European Search Report issued in European Patent Application No. 22779609.1.
PCT/JP2022/006181, "International Preliminary Report on Patentability", Oct. 12, 2023, 6 pages.

* cited by examiner

100

10

20

20

METHOD FOR MANUFACTURING SPECTACLE LENS, AND SPECTACLE LENS

CROSS-REFERENCE TO RELATED APPLICATIONS

This application is the National Stage of International Application No. PCT/JP2022/006181, filed on Feb. 16, 2022, which claims priority to Japanese Patent Application No. 2021-059939, filed Mar. 31, 2021, and the contents of which are incorporated herein by reference.

TECHNICAL FIELD

The present disclosure relates to a method for manufacturing a spectacle lens, and a spectacle lens.

DESCRIPTION OF RELATED ART

Patent document 1 describes a spectacle lens that suppresses a progression of refractive error such as myopia. Specifically, for example, spherical minute convex portions having a diameter of about 1 mm are formed on a convex surface, which is an object-side surface of the spectacle lens. In the spectacle lens, light beams incident from the object-side surface are normally emitted from an eyeball-side surface and focused on a retina of a wearer. On the other hand, light beams that have passed through the minute convex portions are focused at a position closer to the object-side (front-side) than a wearer's retina. As a result, the progression of myopia is suppressed.

Further, Patent document 2 describes a method for manufacturing a spectacle lens molding mold having concave portions for forming the above minute convex portions.

PRIOR ART DOCUMENT

Patent Document

[Patent Document 1] US Application Publication No. 2017/0131567

[Patent Document 2] International Publication No. 2019/124353

SUMMARY OF THE DISCLOSURE

Problem to be Solved by the Disclosure

A manufacturing method described in Patent Document 2 involves a problem such that a material and design type of a lens substrate are limited due to use of a metal molding mold (hereinafter also referred to as a metal mold), and also involves a problem such that it is difficult to prepare many types of convex molds, resulting in a limited convex curve of a spectacle lens, thereby limiting an optical prescription of the spectacle lens, due to a high cost of manufacturing metal molds.

One embodiment of the present disclosure is to provide a technique of manufacturing a spectacle lens capable of suppressing a progression of myopia without using a molding mold having concave portions.

Means for Solving the Problem

A first aspect of the present disclosure provides a method for manufacturing a spectacle lens, including:

preparing a lens substrate having a resin-containing hard coat film formed on at least one main surface; and forming a plurality of protuberances in which at least one of the lens substrate or the hard coat film is protruded, by irradiating the hard coat film with a laser.

A second aspect of the present disclosure provides the method for manufacturing a spectacle lens according to the first aspect, wherein in the formation of the protuberances, the protuberances are formed due to local expanding of the hard coat film by laser irradiation.

A third aspect of the present disclosure provides the method for manufacturing a spectacle lens according to the first aspect, wherein in the formation of the protuberances, the protuberances are formed due to local expanding of the lens substrate by laser irradiation.

A fourth aspect of the present disclosure provides a method for manufacturing a spectacle lens, including:

preparing a lens substrate containing a resin; and irradiating the lens substrate with a laser to form a plurality of protuberances in which the lens substrate is protruded.

A fifth aspect of the present disclosure provides the method for manufacturing a spectacle lens according to the fourth aspect, further including:

forming a hard coat film on at least one main surface of the lens substrate including the protuberances in which the lens substrate is protruded.

A sixth aspect of the present disclosure provides the method for manufacturing a spectacle lens according to the fifth aspect, wherein the hard coat film contains ultraviolet curable resin.

A seventh aspect of the present disclosure provides the method for manufacturing a spectacle lens according to any one of the first to sixth aspects, wherein the laser is a $CO_2$ laser.

An eighth aspect of the present disclosure provides the method for manufacturing a spectacle lens according to any one of the first to seventh aspects, wherein a radiation intensity distribution of the laser is a Gaussian distribution.

A nineth aspect of the present disclosure provides the method for manufacturing a spectacle lens according to any one of the first to eighth aspects, wherein in the formation of the protuberances, laser irradiation is performed, with an irradiation distance of the laser set to be larger or smaller than a focal length of the laser.

A tenth aspect of the present disclosure provides the method for manufacturing a spectacle lens according to any one of the first to nineth aspects, wherein the spectacle lens is a myopia progression suppressing lens, and the protuberances have a property that light beams passing through at least a part of the protuberance are incident on the retina as a divergent light.

An eleventh aspect of the present disclosure provides a spectacle lens, including:

a base portion where a light incident from an object-side surface is emitted from an eyeball side surface and converges on a retina through an eyeball; and a plurality of protuberances in contact with the base portion and having a property that light beams passing through at least a part of the protuberance are incident on the retina as a divergent light, the spectacle lens including a lens substrate and a hard coat film on the lens substrate, and the plurality of protuberances being the protuberances in which a surface of the hard coat film is protruded.

A twelfth aspect of the present disclosure provides a spectacle lens, including:

a base portion where a luminous incident from an object-side surface is emitted from an eyeball side surface and converges on a retina through an eyeball; and a plurality of protuberances that are in contact with the base portion and have a property that light beams passing through at least a part of the protuberance are incident on the retina as a divergent light, the spectacle lens including a lens substrate and a hard coat film on the lens substrate, and the plurality of protuberance being the protuberances in which a surface protuberance due to thermal expansion of the lens substrate is coated with the hard coat film.

A thirteenth aspect of the present disclosure provides the spectacle lens according to the twelfth aspect, wherein the spectacle lens is a myopia progression suppressing lens, and the protuberances have a configuration such that light beams passing through at least a part of the protuberance converge before reaching the retina through the eyeball and are incident on the retina as a divergent light.

A fourteenth aspect of the present disclosure provides the spectacle lens according to the eleventh or twelfth aspect, wherein the protuberance has a surface shape of including a concave portion in a center.

A fifteenth aspect of the present disclosure provides the spectacle lens according to the eleventh or twelfth aspect, wherein a surface shape of the plurality of protuberances is a bell shape having a Gaussian distribution.

A sixteenth aspect of the present disclosure provides the spectacle lens according to the eleventh or twelfth aspect, wherein a surface shape of the plurality of protuberances is a spherical shape.

Advantage of the Disclosure

According to one embodiment of the present disclosure, there is provided a technique of manufacturing a spectacle lens capable of suppressing a progression of myopia without using a molding mold having concave portions.

DETAILED DESCRIPTION OF THE DISCLOSURE

Details of an Embodiment of the Present Disclosure

Next, one embodiment of the present disclosure will be described below with reference to the drawings. The present disclosure is not limited to these examples, but is indicated by the scope of the claims, and is intended to include all modifications within the meaning and scope of equivalents to the scope of the claims.

The spectacle lens described herein has an object-side surface and an eyeball-side surface. The "object-side surface" means a surface located on the object-side when a spectacle having spectacle lenses are worn by a wearer, and the "eyeball-side surface" is the opposite, ie the surface that is located on the eyeball-side when the spectacle having spectacle lenses are worn by the wearer. This relationship also applies to a lens substrate that serves as the basis of the spectacle lens. That is, the lens substrate also has the object-side surface and the eyeball-side surface.

In the present specification, "A to B" means a numerical range of "A or more and B or less".

First Embodiment of the Present Disclosure (1) Spectacle Lens

Figure 1:
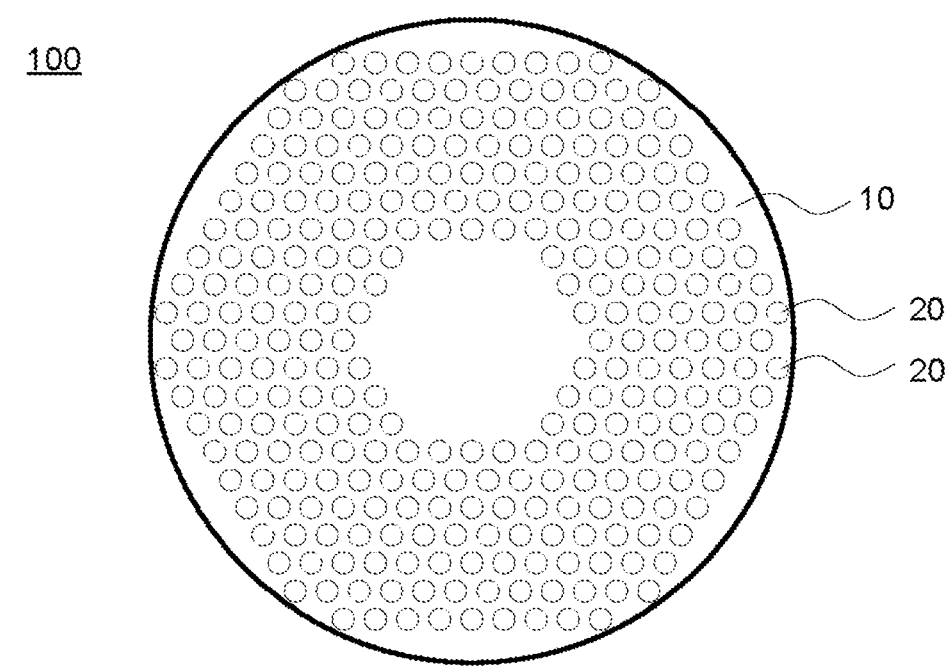
FIG. 1 is a plan view of an object-side surface of a spectacle lens 100 according to a first embodiment of the present disclosure.

FIG. 1 is a plan view of the object-side surface of the spectacle lens 100 according to the present embodiment. The spectacle lens 100 of the present embodiment includes a base portion 10 and a plurality of protuberances 20. The base portion 10 is the portion where light beams incident from the object-side surface are emitted from the eyeball side surface, and converges on a retina through an eyeball. The plurality of protuberances 20 are the protuberances in contact with the base portion 10 and having a property that the light beams passing through at least a part of the protuberance are incident on the retina as a divergent light. For example, the light beams passing through at least a part of the protuberance 20 converges through an eyeball before reaching the retina (position closer to the object-side than the retina) and are incident on the retina as a divergent light.

The base portion 10 has an optical surface determined based on a wearer's prescription, that is, has a portion having a shape capable of realizing a prescribed refractive power of the wearer, which is the portion corresponding to a first refractive region of Patent document 1.

The protuberance 20 is a region at least a part of which does not allow a base power image to be converged at a converging position. The protuberance 20 is a portion having a protruded shape, which is a portion corresponding to the minute convex portions described in Patent document 1. The spectacle lens 100 of the present embodiment is a myopia progression suppressing lens, like the spectacle lens described in Patent document 1. Similarly to the minute convex portions of Patent document 1, the plurality of protuberances 20 of the present embodiment may be formed on at least one of the object-side surface or the eyeball-side surface, out of the two main surfaces of the spectacle lens 100. For example, the present embodiment shows a case where the plurality of protuberances 20 are provided only on the object-side surface (convex surface) of the spectacle lens 100.

The plurality of protuberances 20 are arranged, for example, in an island shape (that is, separated from each other without adjacent to each other). An arrangement mode of the plurality of protuberances 20 is not particularly limited. For example, as shown in FIG. 1, the present embodiment shows a case where the protuberances 20 are arranged independently and sparsely so that the centers of the protuberances 20 are the vertices of an equilateral triangle (hereinafter also referred to as an equilateral triangular arrangement). The number of protuberances 20 included in the spectacle lens 100 is not particularly limited.

As described in FIG. 1 of Patent document 1, a region in which the protuberance 20 is not formed may be provided in the center portion of the spectacle lens 100, or as described in FIG. 10 of Patent document 1, a region in which the protuberance 20 is not formed, may not be provided in the center portion of the spectacle lens 100. For example, as shown in FIG. 1, the present embodiment shows a case where the region in which the protuberance 20 is not formed is provided in the center portion of the spectacle lens 100. In the present embodiment, the center portion of the spectacle lens 100 means a lens center (geometric center, optical center, or centering center) of the spectacle lens 100 and the vicinity thereof. For example, the present embodiment shows a case where the line of sight of the wearer of the spectacle lens 100 passes through the center of the lens when viewed from the front.

Figure 2A:
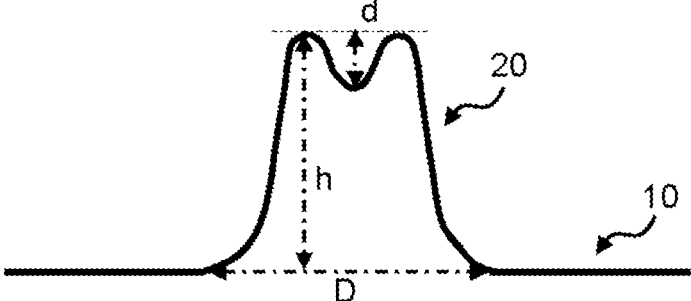
FIG. 2A is a cross-sectional view schematically showing an example of a surface shape of a protuberance 20 according to the first embodiment of the present disclosure.
Figure 2B:
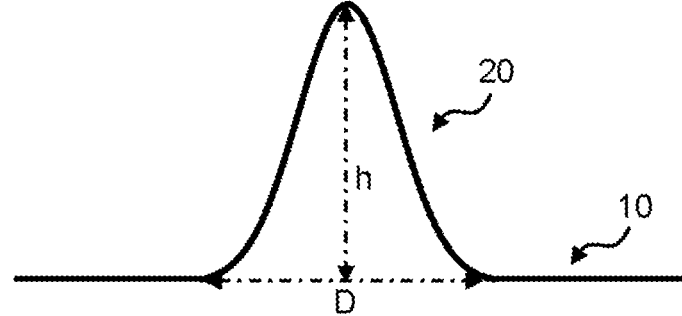
FIG. 2B is a cross-sectional view schematically showing an example of the surface shape of the protuberance 20 according to the first embodiment of the present disclosure.
Figure 2C:
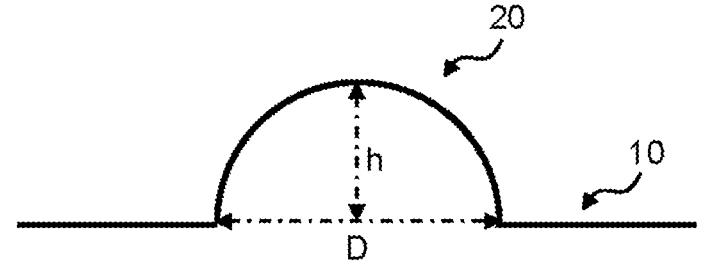
FIG. 2C is a cross-sectional view schematically showing an example of the surface shape of the protuberance 20 according to the first embodiment of the present disclosure.

FIGS. 2A, 2B, and 2C are cross-sectional views schematically showing an example of the surface shape of the protuberance 20. As shown in FIG. 2A, the surface shape of the protuberance 20 may have a concave portion in the center, or as shown in FIG. 2B, may be a bell shape with a Gaussian distribution (normal distribution curve), or as shown in FIG. 2C, may be spherical, and further may be a shape of coexistence of them. In this specification, the bell shape having a Gaussian distribution also includes a shape having a curve that can be approximated to a Gaussian distribution. Further, the spherical shape includes not only a shape whose surface is a perfect sphere, but also a shape whose surface can be approximated to a spherical surface.

The diameter D of the protuberance 20 is, for example, 0.6 to 2.0 mm, and the height h is, for example, 0.1 to 10 μm. Further, when the surface shape of the protuberance 20 has a concave portion in the center as shown in FIG. 2A, the depth d of the concave portion is, for example, 0.1 to 5 μm.

(2) Method for Manufacturing a Spectacle Lens

Figure 3:
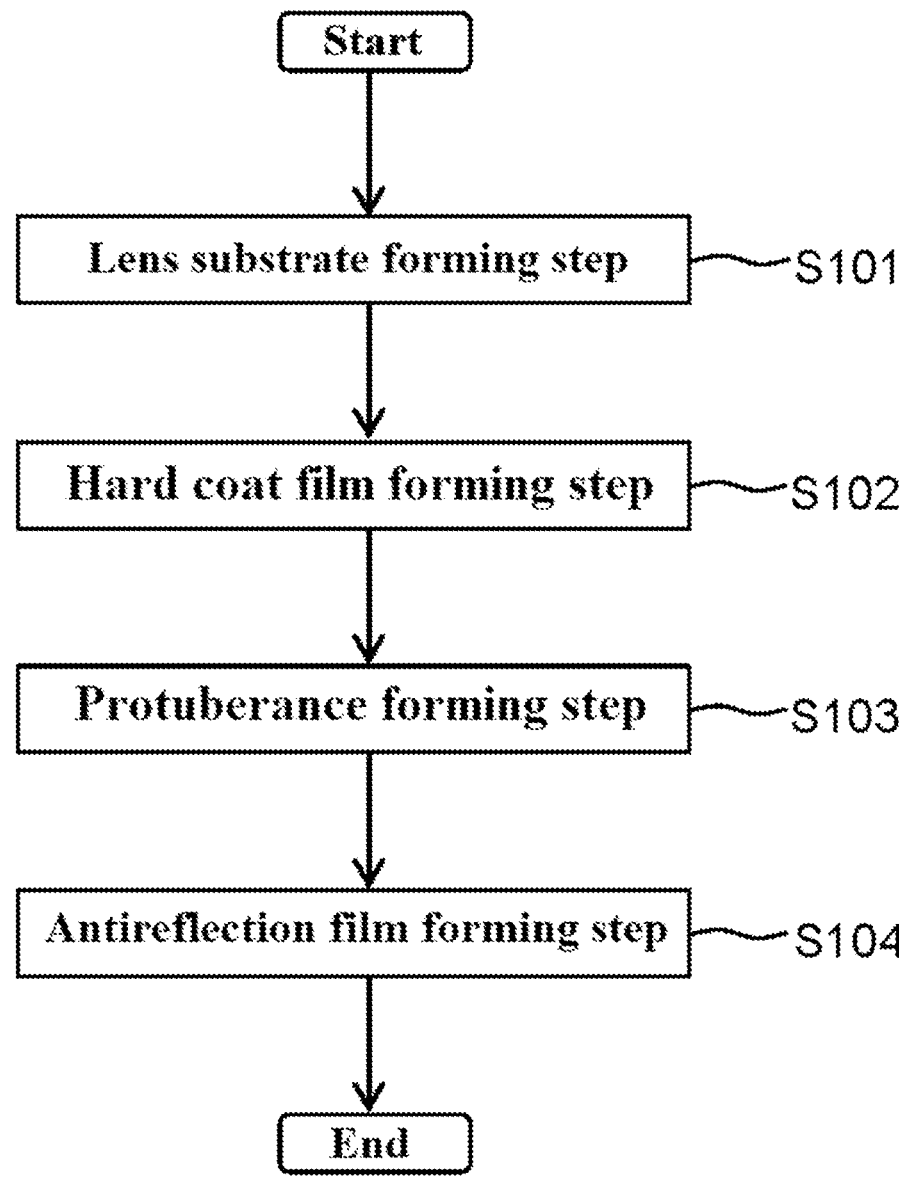
FIG. 3 is a flow chart showing an example of a method for manufacturing the spectacle lens 100 according to the first embodiment of the present disclosure.

FIG. 3 is a flow chart showing an example of a method for manufacturing the spectacle lens 100 according to the present embodiment. As shown in FIG. 3, the method for manufacturing the spectacle lens 100 of the present embodiment includes, for example, a lens substrate forming step S101, a hard coat film forming step S102, a protuberance forming step S103, and an antireflection film forming step S104.

(Lens Substrate Forming Step S101)

The lens substrate forming step S101 is, for example, a step of forming a lens substrate by performing cast polymerization using a molding mold such as a glass mold die.

Various lens substrates commonly used for spectacle lenses can be used, as the lens substrate. The lens substrate may be, for example, a plastic lens substrate or a glass lens substrate. The glass lens substrate may be, for example, a lens substrate comprising inorganic glass. As the lens substrate, a plastic lens substrate is preferable from a viewpoint of light weight and resistance to cracking. Examples of the plastic lens substrate include styrene resins including (meth) acrylic resins, polycarbonate resins, allyl resins, allyl carbonate resins such as diethylene glycol bisallyl carbonate resin (CR-39), vinyl resins, polyester resins, polyether resins, urethane resins obtained by reacting an isocyanate compound with a hydroxy compound such as diethylene glycol, thiourethane resins obtained by reacting an isocyanate compound with a polythiol compound, and cured products obtained by curing curable compositions containing (thio)epoxy compounds having one or more disulfide bonds per molecule (generally also referred to as transparent resins). A curable composition may also be referred to as a polymerizable composition. As the lens substrate, an undyed one (colorless lens) may be used, or a dyed one (dyed lens) may be used. Although the thickness and diameter of the lens substrate are not particularly limited, for example, the thickness (center thickness) may be about 1 to 30 mm, and the diameter may be about 50 to 100 mm. The refractive index of the lens substrate may be, for example, about 1.60 to 1.75. However, the refractive index of the lens substrate is not limited to this range, and may be within this range or vertically apart from this range. In the present disclosure and this specification, the refractive index refers to the refractive index for light with a wavelength of 500 nm.

Here, in a conventional method for manufacturing a spectacle lens for suppressing the progression of myopia, a molding mold having concave portions for forming minute convex portions is used. In contrast, in the lens substrate forming step S101 of the present embodiment, the molding mold having concave portions is not required to be used. This contributes to reducing a manufacturing cost of the spectacle lens 100. Further, the molding mold suited to the design of the minute convex portions is not required to be respectively prepared, thereby making the molding mold versatile.

Further, in a conventional spectacle lens manufacturing method for suppressing the progression of myopia, in order to accurately apply processing to the molding mold to obtain concave portions for forming the minute convex portions, a metal mold that has undergone a cutting process has been used. In contrast, in the lens substrate forming step S101 of the present embodiment, it is not required to apply processing of the concave portions for forming the minute convex portions, and therefore a molding mold such as a glass mold can be used in addition to the metal mold. Accordingly, as described above, a wide variety of lens substrate materials can be used. That is, it can be said that the degree of freedom in designing the spectacle lens 100, which is a lens for suppressing the progression of myopia, can be improved. Particularly, in the case of using the metal mold, there is a concern that the material for the lens substrate will be limited to polycarbonate resin due to a manufacturing problem. Specifically, for example, thermoplastic resin such as polycarbonate resin can be molded in a short period of time by injection molding, and can be used for mass production of the lens substrates without preparing a large number of expensive metal molds. However, a long time is required to cause a reaction of a polymerization-type resin material (for example, thermosetting resin) other than polycarbonate resin, resulting in low productivity. Then, in order to solve this problem and cope with mass production of lens substrates, a large number of expensive metal molds are required to be prepared and meanwhile, according to the present disclosure, preparation of the metal mold is not required. Accordingly, regardless of the material of the lens substrate, efficient manufacturing is realized under a condition that does not excessively increase the manufacturing cost. For example, the effect of the present disclosure is remarkably obtained in the case of using a resin material such as a high refractive index material (often a thermosetting resin) having a refractive index exceeding 1.60.

(Hard Coat Film Forming Step S102)

The hard coat film forming step S102 is, for example, a step of forming a resin-containing hard coat film on at least one main surface (preferably both main surfaces) of the lens substrate formed in the lens substrate forming step S101. The lens substrate forming step S101 and the hard coat film forming step S102 may be combined to be a lens substrate preparation step of preparing a lens substrate in which a resin-containing hard coat film is formed on at least one or the main surfaces.

In the hard coat film forming step S102, the method of forming the hard coat film is not particularly limited, and for example, a spin coating, a dipping, etc., can be used.

The hard coat film includes a cured film formed by curing a curable composition containing a curable compound. The hard coat film contributes to improving the durability of a spectacle lens. The curable compound means a compound having a curable functional group, and the curable composition means a composition containing one or more curable compounds.

Examples of the curable composition for forming the hard coat film include a curable composition containing an organosilicon compound as a curable compound, and also include a curable composition containing metal oxide particles together with the organosilicon compound. An example of the curable composition capable of forming a hard coat film is the curable composition described in JP-A-63-10640.

Further, one aspect of the organosilicon compound includes an organosilicon compound represented by the following general formula (I) and a hydrolyzate thereof.

$$(R^1)_a(R^3)_bSi(OR^2)_{4-(a+b)} \qquad (I)$$

In general formula (I), $R^1$ represents an organic group having a glycidoxy group, an epoxy group, a vinyl group, a methacryloxy group, an acryloxy group, a mercapto group, an amino group, a phenyl group, etc., $R^2$ represents an alkyl group having 1 to 4 carbon atoms, an acyl group having 1 to 4 carbon atoms or an aryl group having 6 to 10 carbon atoms, $R^3$ represents an alkyl group having 1 to 6 carbon atoms or an aryl group having 6 to 10 carbon atoms, and a and b represent 0 or 1 respectively.

The alkyl group having 1 to 4 carbon atoms represented by $R^2$ is a linear or branched alkyl group, and specific examples thereof include a methyl group, an ethyl group, a propyl group, a butyl group, etc. Examples of the acyl groups having 1 to 4 carbon atoms represented by $R^2$ include an acetyl group, a propionyl group, an oleyl group, a benzoyl group, etc. Examples of the aryl group having 6 to 10 carbon atoms represented by $R^2$ include a phenyl group, a xylyl group, a tolyl group, etc. The alkyl group having 1 to 6 carbon atoms represented by $R^3$ is a linear or branched alkyl group, and specific examples thereof include a methyl group, an ethyl group, a propyl group, a butyl group, a pentyl group, and a hexyl. The aryl group having 6 to 10 carbon atoms represented by $R^3$ includes, for example, a phenyl group, a xylyl group, a tolyl group, etc. Specific examples of the compound represented by formula (I) include compounds described in paragraph 0073 of JP-A-2007-077327. Since the organosilicon compound represented by the general formula (I) has a curable group, a hard coat film can be formed by performing a curing treatment after coating.

Metal oxide particles can contribute to adjusting the refractive index and improving the hardness of a cured film. Specific examples of the metal oxide particles include tungsten oxide ($WO_3$), zinc oxide (ZnO), silicon oxide ($SiO_2$), aluminum oxide ($Al_2O_3$), titanium oxide ($TiO_2$), zirconium oxide ($ZrO_2$), tin oxide ($SnO_2$), beryllium oxide (BeO), antimony oxide ($Sb_2O_5$), etc., and single or a combination of two or more kinds of metal oxide particles can be used. The particle size of the metal oxide particles is preferably in a range of 5 to 30 nm from a viewpoint of achieving both scratch resistance and optical properties of the hard coat film. The content of the metal oxide particles in the curable composition can be appropriately set in consideration of the refractive index and hardness of the hard coat film to be formed, and generally, the content may be about 5 to 80% by mass based on a solid content of the curable composition. Further, the metal oxide particles are preferably colloidal particles, from a viewpoint of dispersibility in the hard coat film.

Here, in a conventional spectacle lens manufacturing method for suppressing the progression of myopia, in order to form a hard coat film on the lens substrate on which the minute convex portions are formed, the hard coat film was required to be thin (for example, the film thickness of the hard coat film was less than 2 μm) so that the minute convex portions would not be buried in the hard coat film. In contrast, in the hard coat film forming step S102 of the present embodiment, since the hard coat film is formed on the lens substrate on which the minute convex portions are not formed, there is no particular limit in the thickness of the hard coat film (for example, the film thickness of the hard coat film may be 0.1 to 100 μm). That is, it can be said that the degree of freedom is improved in designing the spectacle lens 100, which is a lens for suppressing the progression of myopia. Particularly, by setting the film thickness of the hard coat film to 2 μm or more, the scratch resistance of the spectacle lens 100 is improved. Further, liquid puddles do not occur around the minute convex portions, and the risk of not being able to obtain defocus as designed can be reduced.

(Protuberance Forming Step S103)

The protuberance forming step S103 is, for example, a step of irradiating the hard coat film formed in the hard coat film forming step S102 with a laser to form, on the hard coat film, a plurality of protuberances 20 in which at least one of the lens substrate or the hard coat film is protruded. Due to containing resin, the hard coat film may be locally softened and expanded by laser irradiation, thereby forming the protuberances 20. That is, the hard coat film formed on the lens substrate thermally expands due to laser irradiation, and the film thickness is locally increased, and the surface of the hard coat film is protruded to form the protuberances 20. That is, the protuberance 20 in this case is a protruded surface of the hard coat film. Further, due to containing resin and having higher laser absorption than the hard coat film, the lens substrate is considered to be softened and expanded, thereby pushing up the hard coat film, resulting in forming the protuberance 20. In this case, the lens substrate may be thermally expanded by laser irradiation, and the hard coat film may cover the formed protuberances on the surface of the lens substrate, resulting in forming the protuberances 20. That is, in this case, the protuberances 20 are formed due to thermal expansion of the lens substrate to form surface protuberances, and covering the surface protuberances with a hard coat film.

The present embodiment mainly shows the case of the protuberances of the hard coat film.

The laser used in the protuberance forming step S103 is preferably a $CO_2$ laser. By using the $CO_2$ laser, the hard coat film has a higher laser absorption rate, which makes it easier to soften and expand the hard coat film, thereby making it easy to form the protuberances 20. Lasers other than $CO_2$ laser (for example, infrared laser, green laser, ultraviolet laser, etc.) may be used in the protuberance forming step S103. In this case, it is preferable to coat the hard coat film with an absorbent that facilitates laser absorption.

In the protuberance forming step S103, when forming one protuberance 20, the laser irradiation may be performed at a fixed point, or the laser irradiation may be performed while applying scanning using a galvanometer scanner, etc.

A radiation intensity distribution of the laser used in the protuberance forming step S103 is preferably Gaussian distribution. This makes it easier to smoothly protrude the edge of the protuberance 20. Therefore due to the formation of the protuberances 20, the influence on the vision through the spectacle lens 100 can be reduced. In the protuberance forming step S103, a beam shaper, etc., may be used to control the radiation intensity distribution of the laser.

Figure 4:
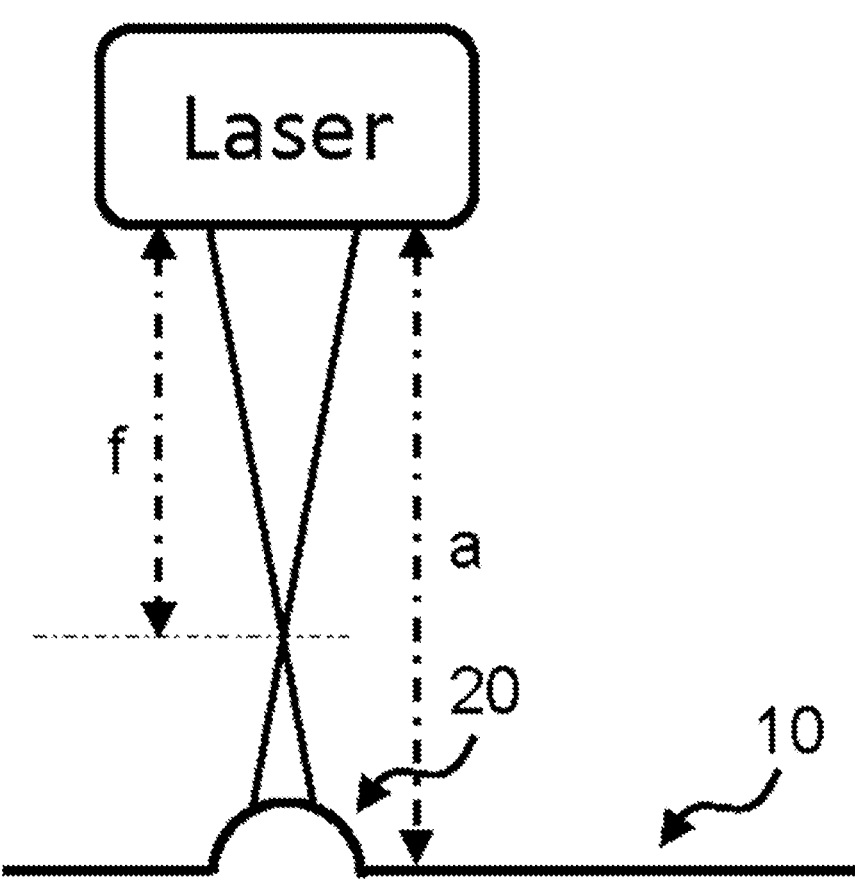
FIG. 4 is a view schematically showing a state of performing laser irradiation in a protuberance forming step S103 according to the first embodiment of the present disclosure.

FIG. 4 is a view schematically showing the state of laser irradiation in the protuberance forming step S103. In the protuberance forming step S103, it is preferable to perform laser irradiation, with a distance between a laser irradiation device and the hard coat film (hereinafter referred to as irradiation distance a) being larger or smaller than a focal length f of the laser. That is, it is preferable to perform laser irradiation, with the hard coat film being shifted with respect to the focus position of the laser irradiation device either farther or closer. Thereby, the size and shape of the protuberance 20 can be adjusted by controlling the distribution of the irradiation energy on the hard coat film. FIG. 4 shows a case where the laser irradiation is performed, with the irradiation distance a being longer than the focal length f, and the hard coat film being shifted to farther from the focus position of the laser irradiation device. Thereby, it becomes easier to control the diameter of the protuberance 20. Specifically, for example, it is preferable to set the irradiation distance a of the laser to be the focal length f±0.1 to 30 mm of the laser.

In the protuberance forming step S103, for example, the size and surface shape of the protuberance 20 can be controlled by adjusting the laser output, irradiation distance, irradiation time, radiation intensity distribution, etc. Specifically, for example, by setting the radiation intensity distribution of the laser as a Gaussian distribution, the surface shape of the protuberance 20 can be made into a bell shape having a Gaussian distribution as shown in FIG. 2B. Further, for example, by adjusting at least one of the laser output, irradiation distance, and irradiation time, the surface shape of the protuberance 20 can be made to have a concave portion in the center as shown in FIG. 2A. It is considered that the softening of the hard coat film progresses remarkably in the vicinity of the center of the laser, causing melting of the hard coat film. The surface shape having a concave portion in the center is thus obtained.

Here, in a conventional spectacle lens manufacturing method for suppressing the progression of myopia, since the minute convex portions are formed using a molding mold having concave portions, the design of the minute convex portions (defocus power, size, shape, layout, etc.) is limited depending on the design of the molding mold. In contrast, in the method for manufacturing the spectacle lens 100 of the present embodiment, the design of the protuberance 20 is not limited because the protuberance 20 is formed as a retrofit by laser processing without using the molding mold having concave portions. Accordingly, even when using the same molding mold, the design of the protuberance 20 can be flexibly changed. In other words, it can be said that the degree of freedom is improved in designing the spectacle lens 100, which is a lens for suppressing the progression of myopia.

The case of using the resin-containing lens substrate will be considered. In the protuberance forming step S103, the laser irradiation may soften and expand the lens substrate as well as the hard coat film. In this case, in the hard coat film forming step S102, it is preferable to form a hard coat film having a larger coefficient of thermal expansion than the coefficient of thermal expansion of the lens substrate. Thereby, even when the lens substrate softens and expands, the protuberance 20 can be stably formed.

(Antireflection Film Forming Step S104)

The antireflection film forming step S104 is, for example, a step of forming an antireflection film on the hard coat film on which the protuberances 20 are formed in the protuberance forming step S103. In the antireflection film forming step S104, in addition to (or instead of) the antireflection film, various films such as a water-repellent or a hydrophilic antifouling film and an antifogging film may be formed. A known technique can be applied to the method of forming these coating films. Note that the antireflection film forming step S104 can be omitted.

The antireflection film forming step S104 is preferably performed in a low temperature environment, for example, about 80 to 100 degrees. Thereby, the protuberance 20 formed in the protuberance forming step S103 is softened again, and the risk of deformation, etc., occurring can be reduced.

Since the antireflection film (and various coating films described above) formed in the antireflection film forming step S104 is considerably thinner (for example, about 0.1 μm) than the height of the protuberance 20, the risk of the protuberance 20 being buried by the antireflection film, etc., can be reduced.

Through the above steps, the spectacle lens 100 including the base portion 10 (the portion where the protuberance 20 is not formed in the protuberance forming step S103) and the plurality of protuberances 20, can be manufactured. Since the plurality of protuberances 20 have the property that the light beams passing through at least a part of the protuberance 20 is incident on the retina as a divergent light, the spectacle lens 100 can suppress the progression of myopia. Accordingly, by the method for manufacturing the spectacle lens 100 of the present embodiment, the spectacle lens 100 capable of suppressing the progression of myopia can be manufactured without using the molding mold having concave portions.

Second Embodiment of the Present Disclosure

Next, a second embodiment of the present disclosure will be described, focusing on a point different from the first embodiment. Elements that are substantially the same as those described in the first embodiment are denoted by the same reference numerals, and descriptions thereof are omitted.

Figure 5:
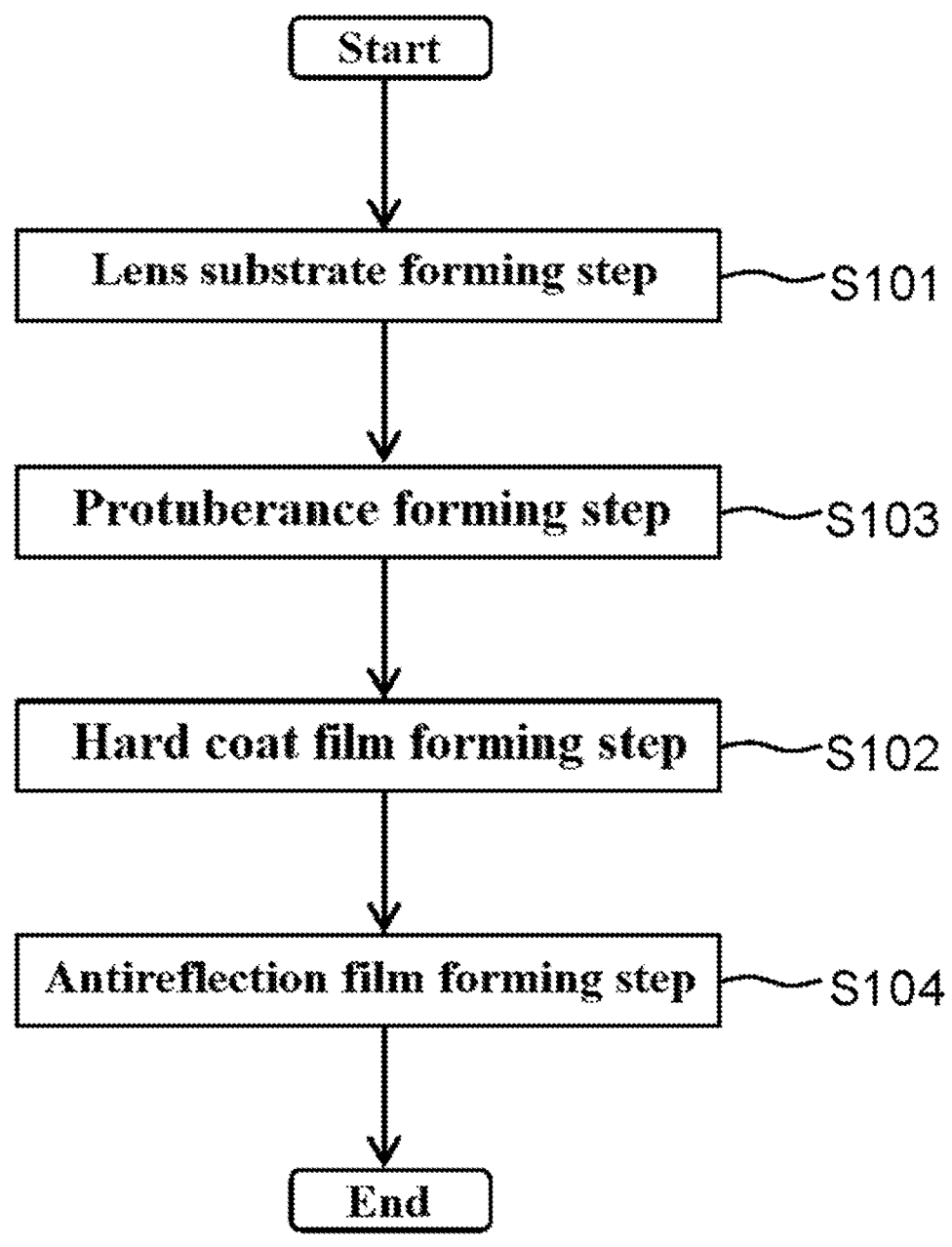
FIG. 5 is a flow chart showing an example of a method for manufacturing the spectacle lens 100 according to a second embodiment of the present disclosure.

FIG. 5 is a flow chart showing an example of a method for manufacturing the spectacle lens 100 according to the present embodiment. As shown in FIG. 5, the method for manufacturing the spectacle lens 100 of the present embodiment includes, for example, the lens substrate forming step S101, the protuberance forming step S103, the hard coat film forming step S102, and the antireflection film forming step S104, in which an order of the hard coat film forming step S102 and the protuberance forming step S103 is reversed from that of the first embodiment.

(Lens Substrate Forming Step S101)

The lens substrate forming step S101 of the present embodiment is, like the first embodiment, a step of forming a lens substrate by performing cast polymerization using a molding mold such as a glass mold. However, in the present embodiment, a resin-containing plastic lens substrate is used as the lens substrate.

(Protuberance Forming Step S103)

The protuberance forming step S103 of the present embodiment is, for example, a step of irradiating the lens substrate formed in the lens substrate forming step S101 with a laser to form a plurality of protuberances 20 in which the lens substrate is protruded. In the present embodiment, due to the resin-containing lens substrate, it is considered that the lens substrate is locally softened and expanded by the laser irradiation, thereby forming the protuberances 20. The laser irradiation can be performed in the same manner as in the first embodiment.

(Hard Coat Film Forming Step S102)

The hard coat film forming step S102 of the present embodiment is, for example, a step of forming a hard coat film on at least one main surface (preferably both main surfaces) of the lens substrate formed in the lens substrate forming step S101. In the hard coat film forming step S102 of the present embodiment, a resin-containing hard coat film is formed on at least one main surface of the lens substrate including the protuberances 20.

In the hard coat film forming step S102 of the present embodiment, it is preferable to form a hard coat film containing UV curable resin (ultraviolet curable resin). For example, when a hard coat film containing thermosetting resin is formed on the lens substrate on which the protuberances 20 are formed, the protuberances 20 may be softened again and deformed because the hard coat film is heated during curing. In contrast, by forming the hard coat film containing UV curable resin, the hard coat film can be photo-cured. Therefore, the risk of softening again and deforming the protuberances 20 can be reduced.

In the protuberance forming step S103, when forming the protuberance 20 having a surface shape including a concave portion in the center as shown in FIG. 2A, the hard coat film may be formed so as to fill the concave portion of the protuberance 20 in the hard coat film forming step S102 of the present embodiment.

(Antireflection Film Forming Step S104)

The anti-reflection film forming step S104 of the present embodiment can be performed in the same manner as in the first embodiment, so the description thereof is omitted.

The spectacle lens 100 including the base portion 10 and the plurality of protuberances 20 can also be manufactured by the above steps, as in the first embodiment. Accordingly, the method for manufacturing the spectacle lens 100 according to the present embodiment also realize the manufacture of the spectacle lens 100 capable of suppressing the progression of myopia without using a molding mold having concave portions.

Other Embodiments of the Present Disclosure

The embodiments of the present disclosure have been specifically described above, but the present disclosure is not limited to the above-described embodiments, and various modifications can be made without departing from the scope of the disclosure.

For example, in the above-described embodiment, explanation is given for a case where the spectacle lens 100 has a fixed design of the plurality of protuberances 20, but in the spectacle lens 100, the design of the plurality of protuberances 20 may be changed. Specifically, for example, the diameter D of the protuberance 20 may be increased from the center portion toward the peripheral portion of the spectacle lens 100.

Examples

Next, examples according to the present disclosure will be described. These examples are one example of the present disclosure, and the present disclosure is not limited to these examples.

(1) Preparation of Lens Substrate

First, a lens substrate having a hard coat film formed on both main surfaces was prepared. A plastic lens substrate having a refractive index of 1.60 was used as the lens substrate. The hard coat film was formed using a thermosetting coating agent.

(2) Formation of Protuberance 20

Next, the hard coat film of the lens substrate prepared in (1) was irradiated with a $CO_2$ laser to form a plurality of protuberances 20, and samples 1 to 12 were obtained. The used $CO_2$ laser had a focal length of 145 mm, an average output of 12 W, a peak wavelength of 10.6 μm, with a radiation intensity distribution being the Gaussian distribution. In forming one protuberance 20, a fixed point irradiation of $CO_2$ laser was applied for 50 to 200 milliseconds. Irradiation conditions (irradiation distance, output) for samples 1 to 12 are shown in Table 1. In Table 1, the irradiation distance is shown with the focal length of the $CO_2$ laser as a reference (0 mm), and the output is shown with the average output of the $CO_2$ laser as a reference (100%).

(3) Measurement for the Shape of Protuberance 20

The surface shape (diameter D, height h, depth d of the concave portion) was measured for the protuberances 20 (samples 1 to 12) formed in (2) using a surface profile measuring machine (Talysurf CCIMP-HSXL). Table 1 shows the results. In the classification of shapes in Table 1, as shown in FIG. 2A, A represents a case of having a concave portion in the center, B represents a case of not having a concave portion in the center (for example, a bell shape with a Gaussian distribution as shown in FIG. 2B, or a spherical shape as shown in FIG. 2C), and A-B represents a case of coexistence of A and B.

TABLE 1

| | Irradiation condition | | Result of surface shape measurement | | | |
|---|---|---|---|---|---|---|
| | Irradiation distance | Output (W) | Classification of shapes | Diameter D (mm) | Height h (μm) | Depth d (μm) |
| Sample 1 | 0 | 100% | A | 1.75 | 1.698 | 0.722 |
| Sample 2 | −1 mm | 95% | A | 1.39 | 1.432 | 0.23 |

TABLE 1-continued

| | Irradiation condition | | Result of surface shape measurement | | | |
|---|---|---|---|---|---|---|
| | Irradiation distance | Output (W) | Classification of shapes | Diameter D (mm) | Height h (μm) | Depth d (μm) |
| Sample 3 | −7 mm | 100% | A | 1.523 | 1.938 | 2.468 |
| Sample 4 | −2 mm | 100% | A | 1.384 | 1.333 | 0.338 |
| Sample 5 | 0 | 84% | A~B | 1.024 | 1.343 | 0.031 |
| Sample 6 | 0 | 84% | A | 1.434 | 1.585 | 0.294 |
| Sample 7 | +2 mm | 179% | A~B | 1.017 | 1.202 | 0.034 |
| Sample 8 | −5 mm | 132% | A | 1.112 | 1.075 | 0.284 |
| Sample 9 | +2 mm | 126% | A | 1.327 | 1.393 | 0.185 |
| Sample 10 | +2 mm | 105% | A | 1.378 | 1.613 | 0.189 |
| Sample 11 | +13 mm | 737% | A~B | 1.137 | 0.814 | 0.018 |
| Sample 12 | +18 mm | 737% | A | 1.144 | 0.98 | 0.118 |

As shown in Table 1, it was confirmed that the size and surface shape of the protuberance 20 could be controlled by adjusting the laser irradiation conditions (irradiation distance, output). Accordingly, it was confirmed that the design freedom of the spectacle lens 100, which is a lens for suppressing the progress of myopia, could be improved by forming the protuberance 20 as a retrofit by laser processing without using a molding mold having concave portions.

DESCRIPTION OF SIGNS AND NUMERALS

10 Base portion
20 Protuberance
100 Spectacle lenses
S101 Lens substrate forming step
S102 Hard coat film forming step
S103 Protuberance forming step
S104 Antireflection film forming step

The invention claimed is:

1. A method for manufacturing a spectacle lens, comprising:

preparing a lens substrate having a resin-containing hard coat film formed on at least one main surface; and forming a plurality of protuberances in which the hard coat film is protruded, by irradiating the hard coat film with a laser, wherein the protuberances are formed due to local expanding of the hard coat film by laser irradiation.

2. The method for manufacturing a spectacle lens according to claim 1, wherein the laser is a $CO_2$ laser.

3. The method for manufacturing a spectacle lens according to claim 1, wherein a radiation intensity distribution of the laser is a Gaussian distribution.

4. The method for manufacturing a spectacle lens according to claim 1, wherein in the formation of the protuberances, laser irradiation is performed, with an irradiation distance of the laser set to be larger or smaller than a focal length of the laser.

5. The method for manufacturing a spectacle lens according to claim 1, wherein the spectacle lens is a myopia progression suppressing lens, and the protuberances have a property that light beams passing through at least a part of the protuberance are incident on the retina as a divergent light.

6. A spectacle lens, comprising:

a base portion where a light incident from an object-side surface is emitted from an eyeball side surface and converges on a retina through an eyeball; and a plurality of protuberances in contact with the base portion and having a property that light beams passing through at least a part of the protuberance are incident on the retina as a divergent light, the spectacle lens including a lens substrate and a hard coat film on the lens substrate, and the plurality of protuberances being the protuberances in which a surface of the hard coat film is protruded due to local expanding of the hard coat film.

7. The spectacle lens according to claim 6, wherein the protuberance has a surface shape of including a concave portion in a center.

8. The spectacle lens according to claim 6, wherein a surface shape of the plurality of protuberances is a bell shape having a Gaussian distribution.

9. The spectacle lens according to claim 6, wherein a surface shape of the plurality of protuberances is a spherical shape.

* * * * *